Sept. 1, 1953  F. W. MEREDITH  2,651,015
ELECTRIC AIRCRAFT CONTROL APPARATUS
Filed Feb. 24, 1950

UNITED STATES PATENT OFFICE 2,651,015

ELECTRIC AIRCRAFT CONTROL APPARATUS

Frederick William Meredith, Cricklewood, London, England, assignor to S. Smith and Sons (England) Limited, London, England, a British company Application February 24, 1950, Serial No. 145,967
In Great Britain February 25, 1949

13 Claims. (Cl. 318—489)

This invention relates to the provision of means for generating a signal in accordance with the instantaneous value of a quantity which varies with time.

It frequently happens that an instrument intended to give such a signal has a lag in its response, that is to say if the quantity has the value $x$ the signal given by the instrument is proportional not to $x$ but to $$\frac{1}{1+t_1 D} \cdot x$$

where D denotes the operator of differentiation with respect to time and $t_1$ is a constant, the "time constant" of the response of the instrument. As is well known, if the value of $x$ changes from one constant value to another an expression of the form $$\frac{1.x}{1+t_1 D}$$

denotes a quantity whose value, after such a change, approaches the value $x$ exponentially with a time-constant $t_1$. It is clear that such a signal will not be satisfactory for either obtaining an indication or exerting a control in accordance with variations in the quantity of a period comparable with the time-constant of response of the instrument.

One example of such an instrument is given by the conventional rate of climb indicator as commonly used in aircraft where, if H is the height of the aircraft, the response of the instrument is given by an expression of the form $$\frac{1}{1+t_1 D} \cdot DH$$

A further example of such an instrument is provided by a pendulum or equivalent device when used for producing an indication or exerting a control on an aircraft in accordance with its position relative to the earth's gravitational field. However, the indication provided by the mean position of a pendulum or equivalent device is only correct so long as the aircraft is not accelerating (for instance if the pendulum is used to indicate the position of the aircraft in pitch the indication will only be correct so long as the aircraft is not accelerating in pitch). In the case of aircraft as constructed until comparatively recently this was not particularly important as, for example, aircraft were such that the terminal velocity was quickly reached after a change of attitude in pitch and the error was transient and not important. However, such is not the case with modern aircraft of clean aerodynamic design. With such aircraft there is an appreciable lag between the occurrence of a change of attitude in pitch and the attainment of the terminal velocity appropriate to the changed attitude; and in addition aircraft speeds are higher, so necessitating a more rapidly responsive control system. It is found that if an aircraft deviates through an angle $\theta$ from its datum attitude in pitch, and a pendulum is arranged to be responsive to movements from that datum attitude (as are, for example, the pendulums in the automatic control system for aircraft disclosed in British specification 611,037) the deviation of the pendulum from its datum position is given, to a sufficiently good approximation, in the long period motion of the aircraft, by $$p = \frac{1}{1+t_3 D} \theta$$

where D denotes the operator of differentiation with respect to time and $$t_3 = -\frac{1}{K}$$

where K is the constant of proportionality between the force per unit mass acting on the aeroplane and the velocity in the forward direction. As between different aircraft those of cleaner aerodynamic design will have smaller values of K and so larger values of $t_3$, i. e. the lag implied by the operator $$\frac{1}{1+t_3 D}$$

will be increased for the aircraft of cleaner design.

The object of the present invention is to provide means for correcting the signal produced by an instrument having an inherently lagging response to variations of a quantity to remove the effect of the lag and thereby render the instrument responsive to variations in the quantity the response being substantially independent of the frequency of such variations.

According to the present invention a system for generating a signal substantially in accordance with the instantaneous value of a quantity comprises a first instrument responsive to variation of the quantity and generating a first signal lagging upon said quantity a second instrument generating a second signal in accordance with the rate of change of said quantity with substantially zero lag, means to generate a third signal which is a transient integral of said second signal, the time constant of said transient integral being substantially equal to the time-constant of response of the first instrument, and means to add multiples of said first and third signals to give a fourth signal, said multiples being such that said fourth signal is substantially in accordance with the quantity. By a "transient integral of a signal" we mean a signal proportional to the result of operating on the signal with an operator of the form $$\left(\frac{1}{1+t_2D}\right)$$

$t_2$ being the time-constant of the integral.

According to a first form of the invention a system for generating an electric signal substantially in accordance with the rate of climb of a body comprises an atmospheric pressure operated rate of climb instrument of conventional type driving an electric signal generator to produce a first electric signal in accordance with the response of said rate of climb instrument, an accelerometer producing a second electric signal in accordance with vertical acceleration of the body, means to generate a third electric signal which is a transient integral of the said second electric signal, the time-constant of said transient integral being substantially equal to the time-constant of the rate of climb instrument, and means to add multiples of said first and third electric signals to give a fourth electric signal, said multiples being such that said fourth signal is substantially in accordance with the instantaneous rate of climb.

Conveniently the said signal generator comprises a potentiometer energised from a suitable D. C. supply, the slider being actuated by the rate of climb instrument, while the accelerometer comprises a spring-restrained mass actuating the slider of a further D. C. energised potentiometer and the means for obtaining the transient integral of the second signal (obtained from the accelerometer) comprise a condenser and resistor connected in series across which the second signal is applied, the third signal being provided by the voltage across the condenser and the time constant of the condenser-resistor combination being equal to the time-constant of the rate of climb instrument. The adjustment of the multiples of the first and third signals to ensure that their sum is substantially in accordance with rate of climb may conveniently be made by varying either or both of the D. C. voltages applied to the potentiometers actuated respectively by the rate of climb instrument and the accelerometer.

According to a second form of the present invention, a system for generating a signal in accordance with the position of an aircraft about its pitch axis relative to the earths gravitational field comprises a pendulum or like device adapted to give a first signal in accordance with a persistent displacement of the craft about the pitch axis in relation to the earth's gravitational field, a device giving a second signal in accordance with the rate of turn of the craft about the said pitch axis, means giving a third signal which is a transient integral of the said second signal, the time-constant of the transient integral being equal to the time-constant of lag of the pendulum signal and means to add multiples of said first and third signals to give a fourth signal, said multiples being such that said fourth signal is substantially in accordance with the instantaneous displacement of the craft about the pitch axis. The means giving a signal in accordance with the rate of turn of the craft may conveniently be a rate of turn gyroscope.

Embodiments of the invention will now be described with reference to the accompanying drawings of which:

Figure 1:
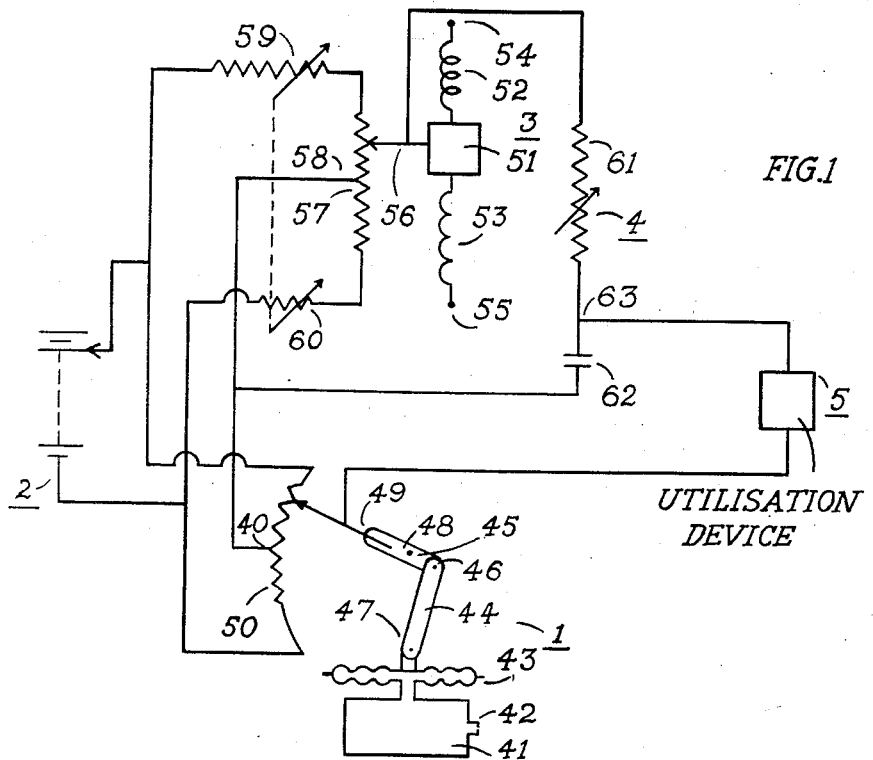
Figure 1 shows a device for giving an electric signal in accordance with the instantaneous rate of climb of an aircraft.

Referring to Figure 1 the device there shown consists of a rate of climb instrument 1, giving an electric D. C. signal lagging on the actual rate of climb, together with an accelerometer 3 giving a D. C. signal in accordance with the rate of change of rate of climb, a transient integrator 4 and a battery 2 supplying the necessary power input to devices 1 and 3. The output signal from the device, in accordance with the actual rate of climb, is fed to the utilisation device 5, which may be either an indicator or any kind of device which requires a control signal input in accordance with true rate of climb.

The rate of climb instrument 1 is conventional, and comprises a thermally-insulated reservoir 41 connected to the atmosphere through a leak 42. A pressure sensitive capsule 43 is mounted so as to be responsive to the difference between the pressures inside and outside reservoir 41. The capsule deflection, which as is known lags on the actual rate of climb, controls, by means of a conventional multiplying mechanism shown diagrammatically as consisting of a lever arm 45 pivoted at 48 and connected to the capsule by link 44 and pins 46, 47, the position of the slider 49 of a potentiometer 50 centre tapped at 40. The potentiometer 40 is connected to the battery 2, and the linkage 44, 45 etc. is such that when the pressures inside and outside the reservoir 41 are equal the slider 49 rests on the centre-tap 40. Thus a D. C. signal is produced between slider 49 and centre tap 40 which is of the form $$\frac{a}{1+t_1D} \cdot D.H$$

where $a$ is a constant.

The accelerometer 3 is also conventional and comprises a mass 51 mounted for vertical movement in the aircraft against a resilient restraint provided by springs 52, 53 anchored to the aircraft at points 54 and 55 respectively. The slider 56 of a potentiometer 57 centre-tapped at 58 and fixed in the aircraft is determined by the position of the mass 51, and the arrangement is such that slider 56 rests on centre tap 58 when the aircraft is not subjected to vertical acceleration. The potentiometer 57 is connected, through ganged equal variable resistors 59, 60, in parallel with potentiometer 40 to battery 2. A D. C. signal is thus produced between slider 56 and centre tap 58 which is of the form $bD^2H$ where $b$ is a constant which may be adjusted by adjusting resistors 59, 60. Centre taps 58 and 40 are connected together.

The signal $bD^2H$ is applied to the transient integrator circuit 4 consisting of variable resistor 61 (value R ohms) and condenser 62 (value C farads), one end of resistor 61 being connected to slider 56 and one terminal of the condenser 62 being connected to the junction of centre taps 40 and 58. A D. C. signal is thus produced between the common terminal 63 of the resistor 61 and condenser 62 and centre tap 58 which is of the form $$\frac{bD^2H}{1+CRD}$$

or $$\frac{bD^2H}{1+t_2D}$$

where $t_2$ (equal to CR) can be adjusted by adjusting resistor 61, and $b$ can be adjusted by adjusting resistors 59, 60.

The output signal from the whole device is obtained between terminal 63 and slider 49, and is thus of the form $$\left(\frac{aDH}{1+t_1D}+\frac{bD^2H}{1+t_2D}\right)$$

The constant $t_2$ is adjusted to make it equal to $t_1$, and the constant $b$ to make it equal to a $t_1$. The net signal fed to the utilisation device 5 is then of the form $$a\left(\frac{1}{1+t_1D}+\frac{t_1D}{1+t_1D}\right)DH, \text{ or } aDH$$

as is required.

The constant $a$ can of course be adjusted by adjusting the supply voltage to the complete device.

Figure 2:
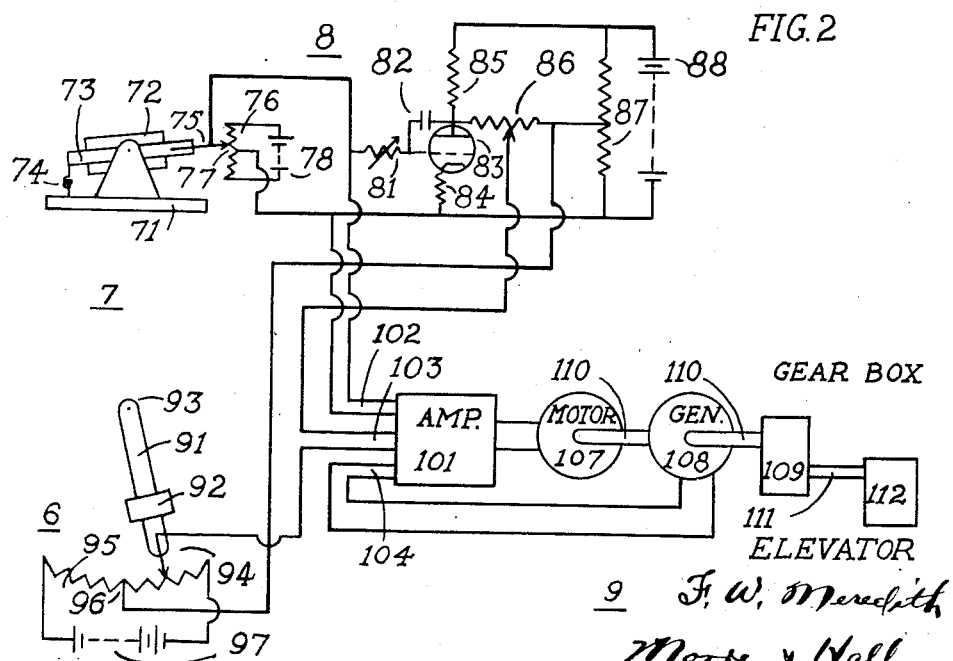
Figure 2 shows a device for giving an electric signal in accordance with the instantaneous attitude in pitch of an aircraft, together with the components of an automatic pilot system for utilising the signal.

Referring now to Figure 2 there is shown a pendulum 6 giving a D. C. signal lagging on the instantaneous attitude of the aircraft about the pitch axis, a rate of turn gyroscope 7 giving a signal in accordance with the instantaneous rate of turn of the aircraft about the pitch axis, a transient integrator 8, and the remaining components 9 required for an automatic control system for controlling an aircraft about the pitch axis. The whole system thus constitutes, in effect, a modification of the pitch channel of the automatic pilot system for aircraft disclosed in British specification No. 611,037.

The pendulum 6 comprises a rod 91 and bob 92 mounted for movement about an axis 93 parallel with the pitch axis of the aircraft. The rod 91 carries at its lower end the slider 94 of a potentiometer 95 centre-tapped at 96. The ends of the potentiometer 95 are connected to a battery 97 and the pendulum is so arranged that when the aircraft is in level unaccelerated flight the slider rests on the centre-tap. Thus, if $\theta$ denotes the attitude in pitch of the aircraft a signal of the form $$\frac{c}{1+t_3D}\cdot\theta$$

where $c$ is a constant, is obtained between 94 and 95, in the long period motion of the aircraft to a sufficient approximation.

The rate of turn gyroscope 7 is conventional and comprises a base 71 upon which is mounted, by means of suitable brackets, a gyroscope rotor 72 carried in a gimbal ring 73. Precession of the gyroscope about an axis at right angles to the rotor spin axis is restrained by a spring 74 between the gimbal ring 73 and the base 71. The gyroscope is mounted in the aircraft with its spin and precession axes at right angles to the pitch axis. The slider 75 of potentiometer 76 centre-tapped at 77 is carried by the gimbal ring 73. The ends of the potentiometer 76 are connected to a battery 78, and the potentiometer is so arranged that when the aircraft is not pitching the slider 75 rests on the centre-tap 77. Thus at any time a signal of the form $fD\theta$ is obtained between the slider 75 and centre-tap 77.

The transient integrator 8 is of the kind embodying the well-known "Miller" integrating circuit. It comprises an amplifying valve 83 having an anode load resistor 85 and cathode bias resistor 84, the stage being supplied with power from a battery 88.

A condenser 82 is connected between grid and anode of valve 83 and a variable resistor 81 is also connected to the grid. The input terminals to the integrator are constituted by the remaining terminal of this resistor and the negative terminal of the battery. These are connected respectively to the slider 75 and centre tap 77 of potentiometer 76. It is well known that a circuit of the kind shown behaves similarly to the circuit 4 shown in Figure 1, with a time constant effectively multipled by a factor approximately equal to the stage gain of the valve 83 as compared with that obtained if the resistor 81 and condenser 82 were used in a simple circuit of the kind shown in Figure 1. It is thus possible to obtain very long effective time-constants from an arrangement of this kind without the use of excessively large condensers or resistors. The anode of valve 83 is connected through potentiometer 86 to the slider of a potentiometer 87 connected across the battery 88. The slider of potentiometer 87 is adjusted so that its potential, when slider 75 is on the centre-tap of potentiometer 76, is equal to the anode potential of valve 83. The output from the transient integrator is obtained between the sliders of potentiometers 86 and 87. It will be seen that this is of the form $$\frac{gD\theta}{1+t_4D}$$

where the constant $t_4$ may be adjusted by adjusting resistor 81 and the constant $g$ may be adjusted by adjusting the slider of potentiometer 86. The slider of potentiometer 87 is connected to the centre-tap 96 of potentiometer 95 so that the corrected signal in accordance with the instantaneous pitch attitude of the aircraft is obtained between the pair of lines 103, which are connected respectively to the sliders of potentiometers 86 and 95. The resultant signal between the lines 103 is of the form $$\left(\frac{c\theta}{1+t_3D}+\frac{gD\theta}{1+t_4D}\right)$$

Resistor 81 is adjusted to make $t_4$ equal to $t_3$ and potentiometer 86 to make $g$ equal to $ct_4$. The resultant signal is then of the form $$c\left(\frac{1}{1+t_3D}+\frac{t_4D}{1+t_4D}\right)\theta, \text{ or } c\theta$$

as is required.

The corrected pitch signal is used as the monitor signal in the automatic pitch control system 9.

In the manner disclosed in British specification No. 611,037 the elevator 112 is controlled in accordance with the rate of pitch of the aircraft. One input signal to the pitch servo amplifier 101 is provided by the rate of turn signal from gyroscope 7 through leads 102. The output from amplifier 101 controls the elevator servomotor 107, the output shaft 110, of which drives a tachometric signal generator 108 and, through a gear-box 109 and shaft 111, the elevator 112. The output from generator 108 is applied as a further input signal over lines 104 to amplifier 101, this input being in opposition to the rate of turn input signal. The manner in which the various signals control the aircraft is fully discussed in British specification No. 611,037. It is found that if the unmodified pendulum signal is used as a monitor signal for the pitch channel a poorly damped long-period pitch motion of the aircraft may result, the poor damping being due to the lag in the pendulum signal. By the use of the present invention in the manner shown this lag is removed in the long period motion, and the damping of the long-period motion is thereby improved.

While there have been described and illustrated what are at present considered to be the preferred embodiments of the invention, it is to be understood that the description and drawings are to be interpreted solely in an illustrative sense, the scope of the invention being limited solely by the appended claims.

I claim:

1. A system for correcting a first signal from a first instrument having a lagging response to variations of a quantity comprising, a second instrument generating a second signal in accordance with the rate of change of said quantity with substantially zero lag, means to generate a third signal which is a transient integral of said second signal, the time-constant of said transient integral being substantially equal to the time constant of response of the first instrument, and means to add multiples of said first and third signals to give a fourth signal, said multiples being such that said fourth signal is substantially in accordance with the quantity.

2. A system for generating electric signal substantially in accordance with the rate of climb of a body comprising an atmospheric pressure operated rate of climb instrument, driving an electric signal generator to produce a first electric signal in accordance with the response of said rate of climb instrument, an accelerometer producing a second electric signal in accordance with the vertical acceleration of the body, means to generate a third electric signal which is a transient integral of the said second electric signal, the time-constant of said transient integral being substantially equal to the time constant of response of the first instrument, and means to add multiples of said first and third signals to give a fourth signal, said multiples being such that said fourth signal is substantially in accordance with the rate of climb.

3. A system as claimed in claim 2 wherein the signal generator comprises a potentiometer energised from a suitable D. C. supply, the slider being actuated by the rate of climb instrument and the accelerometer comprises a spring-restrained mass actuating the slider of a further D. C. energised potentiometer.

4. A system as claimed in a claim 3 wherein the means for obtaining the transient integral of the second signal comprise a condenser and resistor connected in series across which the second signal is applied, the third signal being provided by the voltage across the condenser, and the time constant of the condenser-resistance combination being equal to the time-constant of the rate of climb instrument.

5. A system as claimed in claim 2 wherein the signal generator comprises a potentiometer energised from a suitable D. C. supply, the slider of said potentiometer being actuated by the rate of climb instrument, the accelerometer comprises a spring-restrained mass actuating the slider of a further D. C. energised potentiometer and the means for obtaining the transient integral of the second signal comprise a condenser and resistor connected in series across which the second signal is applied to give the third signal as the voltage across the condenser, the time-constant of the condenser and resistor being equal to the time-constant of the rate of climb instrument.

6. A system for generating a signal in accordance with the position of an aircraft about its pitch axis relative to the earth's gravitational field comprising a pendulum or like device adapted to give a first signal in accordance with a persistent displacement of the craft about the pitch axis in relation to the earth's gravitational field, a device giving a second signal in accordance with the rate of turn of the craft about said pitch axis, means giving a third signal which is a transient integral of the said second signal, the time-constant of the transient integral being equal to the time constant of lag of the pendulum signal, and means to add multiples of said first and third signals to give a fourth signal, said multiples being such that said fourth signal is substantially in accordance with the position of the aircraft about the pitch axis.

7. A system as claimed in claim 6 wherein the device giving a signal in accordance with the rate of turn of the craft is a rate of turn gyroscope.

8. A system as claimed in claim 6 wherein the signals are electric voltage signals.

9. A system as claimed in claim 6 wherein the means for giving a transient integral comprise a thermionic valve amplifier with a resistive anode load, a condenser connected between the anode and control grid of said valve and a resistor with one terminal connected to the said control grid, the second signal being applied as a D. C. voltage effectively between the grid and cathode of said valve, whereby the transient integral is provided by the variation of the potential of the anode of said valve from its datum value.

10. In an automatic pilot system for the control of an aircraft in pitch of the kind in which the attitude in pitch is monitored by a signal from a pendulum or the like device the combination of a device responsive to rate of turn of the aircraft in pitch, means to generate a transient integral of the said rate of turn, said transient integral having a time-constant substantially equal to the time-constant of lag of the monitor signal, and means to apply said transient integral signal to the automatic pilot system to correct the lag of the monitor signal and so to improve the damping of the long period motion of the aircraft.

11. A system as claimed in claim 2 wherein the means for obtaining the transient integral of the second signal comprise a condenser and resistor connected in series across which the second signal is applied, the third signal being provided by the voltage across the condenser, and the time constant of the condenser-resistance combination being equal to the time-constant of the rate of climb instrument.

12. In a control system for a movable craft, in combination a first device for generating a first signal in response to a condition of the craft, a second device for generating a second signal in response to the rate of change of said condition, transient integrator circuit means connected to said second device to produce a third signal which is the transient integral of said second signal and voltage supply means adjusted to such values and so connected by circuit means as to add multiples of said first and third signals which combine to produce a fourth signal representing a corrected response to said condition.

13. In a control system for a movable craft, in combination a condition responsive device for generating a first signal in response to a navigating condition of said craft, an acceleration responsive instrument for generating a second signal in response to the rate of change of said condition, transient integrator means connected to said instrument to produce a third signal which is a transient integral of said second signal, the time constant of said integral being substantially equal to the time-constant of response of said device and voltage supply means so adjusted and so connected by circuit means as to add multiples of said first and third signals to produce a fourth signal representing a corrected response to said condition.

FREDERICK WILLIAM MEREDITH.

References Cited in the file of this patent

UNITED STATES PATENTS

| Number | Name | Date |
| --- | --- | --- |
| 2,450,907 | Newton et al. | Oct. 12, 1948 |
| 2,470,099 | Hall | May 17, 1949 |
| 2,488,286 | Glenny | Nov. 15, 1949 |
| 2,577,061 | Woolson et al. | Dec. 4, 1951 |